United States Patent [19]
Jackson et al.

[11] 4,298,095
[45] Nov. 3, 1981

[54] WORK SUPPORT FRAME

[75] Inventors: Ronald A. Jackson, Brockville; John Maruscak, Athens, both of Canada

[73] Assignee: Black & Decker Inc., Newark, Del.

[21] Appl. No.: 108,449

[22] Filed: Jan. 17, 1980

Related U.S. Application Data

[63] Continuation-in-part of Ser. No. 10,210, Feb. 8, 1979.

[51] Int. Cl.³ ........................ F16M 11/00; E04G 1/32

[52] U.S. Cl. .................................... 182/184; 182/185; 182/224

[58] Field of Search ................................ 182/181–186, 182/224–226, 204, 205; 248/407, 408, 217.1, 188.8, 188.5, 354 R, 354 L, 354 S, 355, 246; 74/531

[56] References Cited

U.S. PATENT DOCUMENTS

| | | | |
|---|---|---|---|
| 351,143 | 10/1886 | Whittingham | 182/187 |
| 371,279 | 10/1887 | Richstine | 182/184 |
| 714,761 | 12/1902 | Tilley | 182/184 |
| 789,843 | 5/1905 | Dennis | 248/246 |
| 1,271,095 | 7/1918 | Staines | 182/184 |
| 1,441,806 | 1/1923 | Hoitsma | 182/136 |
| 2,038,899 | 4/1936 | Hoitsma | 182/148 |
| 2,216,912 | 10/1940 | Hoitsma | 182/148 |
| 2,611,932 | 9/1952 | Olssan | 248/355 |
| 4,228,871 | 10/1980 | Koffski | 182/185 |

*Primary Examiner*—Reinaldo P. Machado
*Attorney, Agent, or Firm*—Harold Weinstein; Walter Ottesen; Edward D. Murphy

[57] ABSTRACT

A one piece frame for carrying a platform made from a unitary channel adapted to releasably receive a plurality of support legs. Adjustable top brackets mountable in the channel for supporting the platform connect to the frame to affix thereto.

Bracing members on the frame prevent lateral shifting of the support legs. The channel at the leg is notched or recessed to permit a clamp to engage standard and substandard legs commonly made from two (2)-foot-by-four (4)-foot wood. Also, the clamps are provided with a plurality of teeth angularly disposed to engage the adjacent leg substantially perpendicular.

10 Claims, 8 Drawing Figures

WORK SUPPORT FRAME

CROSS REFERENCE AND RELATED APPLICATION

This application is a continuation-in-part of the copending application Ser. No. 10,210 filed Feb. 8, 1979, entitled "Work Support."

BACKGROUND OF THE INVENTION

Work or platform supports may be termed sawhorses. The prior art sawhorses were complex and costly, often requiring extensive set-up operations. Further, depending on loads and length of the legs, the prior art sawhorses required independent bracing to interconnect adjacent legs for added stability of the sawhorse. If clamps having teeth were used, they were susceptible to slippage, and only standard or larger size legs were used.

SUMMARY OF THE INVENTION

A work support includes a one piece frame having a channel with downwardly and outwardly depending portions for receiving legs which are releasably clamped in position by self-locking clamps affixed to the leg portions. Top brackets secure a platform to the frame.

Bracing members of the present invention provide the frame with added stability and coact with the clamps to prevent lateral shifting of the legs.

The leading edge of the clamp has teeth set off at an angle to engage the leg substantially perpendicular positively to clamp the same.

Recesses or notches are formed on the leg portions to receive the leading edges of the clamps for engagement with substandard legs.

It is, therefore, an object of the present invention to provide an improved work support frame which overcomes the disadvantages of the prior art; which is simple, economical and reliable; which laterally supports the legs; which has bracing to coact with the clamp positively to secure the leg; which angles the teeth of the clamp for substantially perpendicular engagement with the legs; and which notches the leg portions to permit the clamp to engage substandard legs.

Other objects and advantages will be apparent from the following description of illustrated embodiment of the invention and the novel features will be particularly pointed out hereinafter in the claims.

DESCRIPTION OF THE INVENTION

In the illustrated embodiment of the invention, the work support recited in copending parent application, Ser. No. 10,210, filed Feb. 8, 1979, incorporated herein by reference is depicted at 10 in FIG. 1 and includes the improvement features of the present invention. Accordingly, the support 10 may be used in pairs to carry a platform 12, and therefore includes a pair of laterally spaced frames 14 to which pairs of legs 16 are releasably connected.

Figure 2:
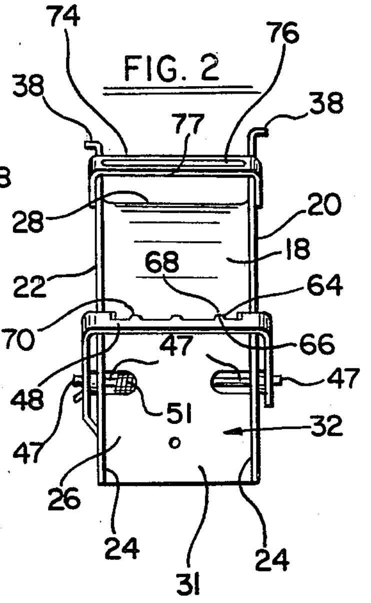
FIG. 2 is a side elevational view of the frame.
Figure 3:
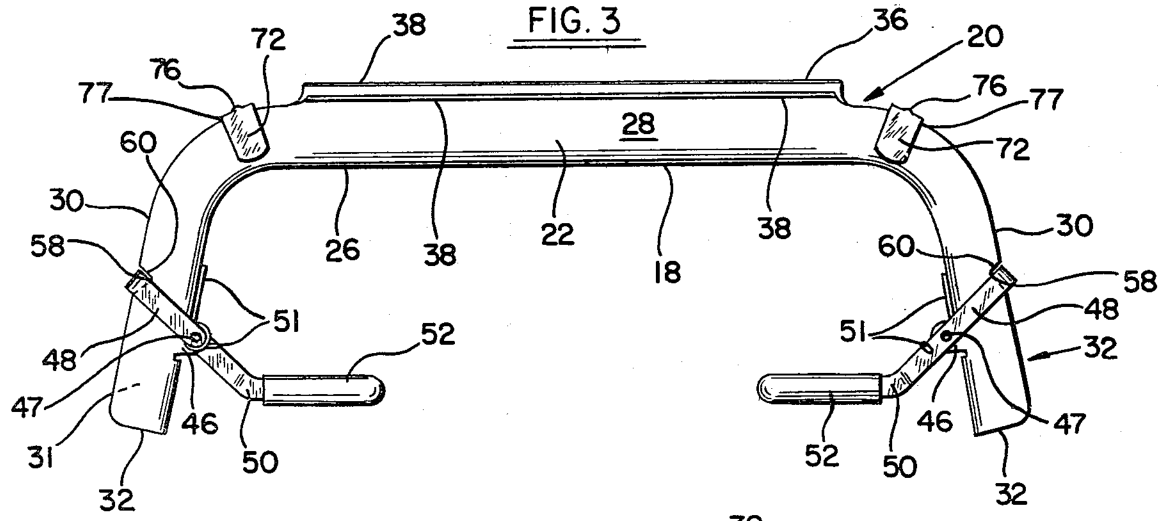
FIG. 3 is a front elevational view of the frame.
Figure 4:
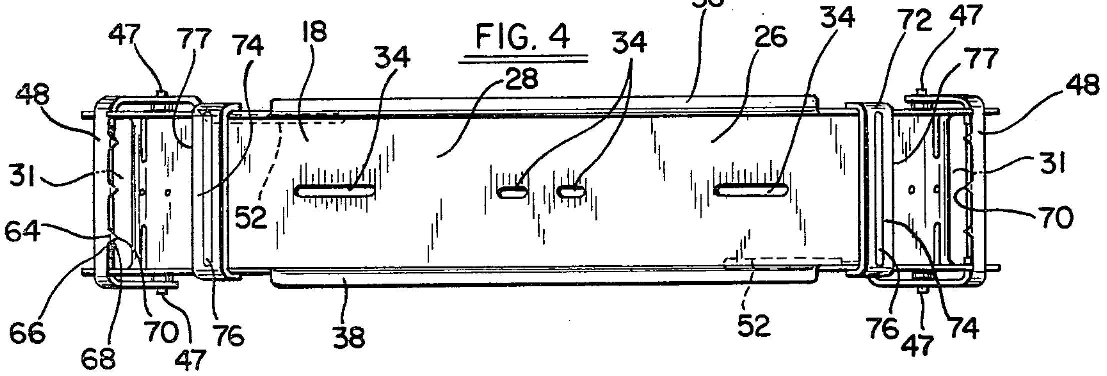
FIG. 4 is a top plan view of the frame.
Figure 5:
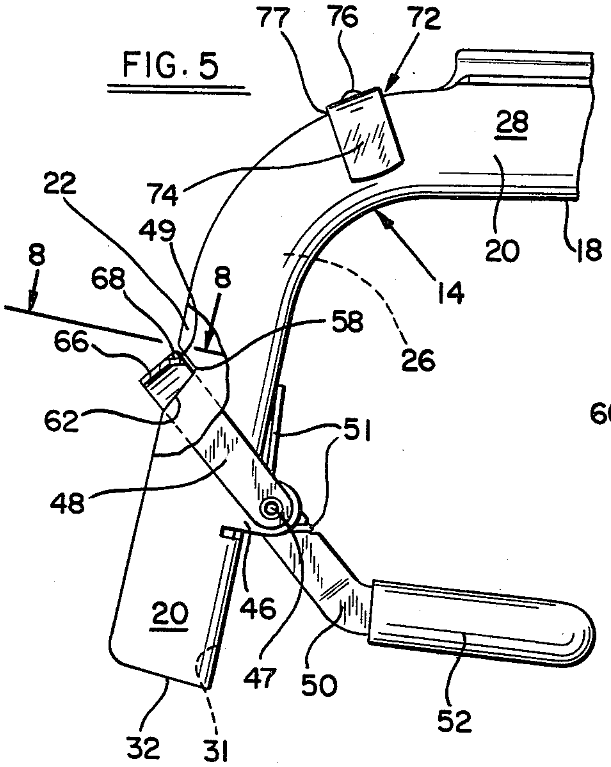
FIG. 5 is a partial front elevational view partly broken away showing the bracing member, leg notch and clamp teeth of the present invention.

The frame 14 illustrated in FIGS. 2, 3 and 4 defines a "U" shaped channel.

The frame 14 shown in FIGS. 2, 3 and 4 has a base 18 which is continuous, having outturned flanges 20, 22 formed at the outer edges 24 thereof forming a central channel 26 within the frame 14. The frame 14 has a substantially horizontal portion 28 and is bent downwardly and outwardly at its opposite ends to form downwardly and outwardly depending leg receiving portions 30.

The central channel 26 has an opening as at 31 at the outer sides of the frame 14 for receiving the legs 16. Because of the compound angle at the leg portions 30, the outturned flanges 20, 22 are of unequal heights with the flange 20 being higher than the flange 22. However, when assembled, the flanges 20, 22 cooperate to provide a substantially horizontal support surface 38, 38 for the platform 12. Aligned longitudinal slots 34 are formed centrally of the base 18.

Figure 1:
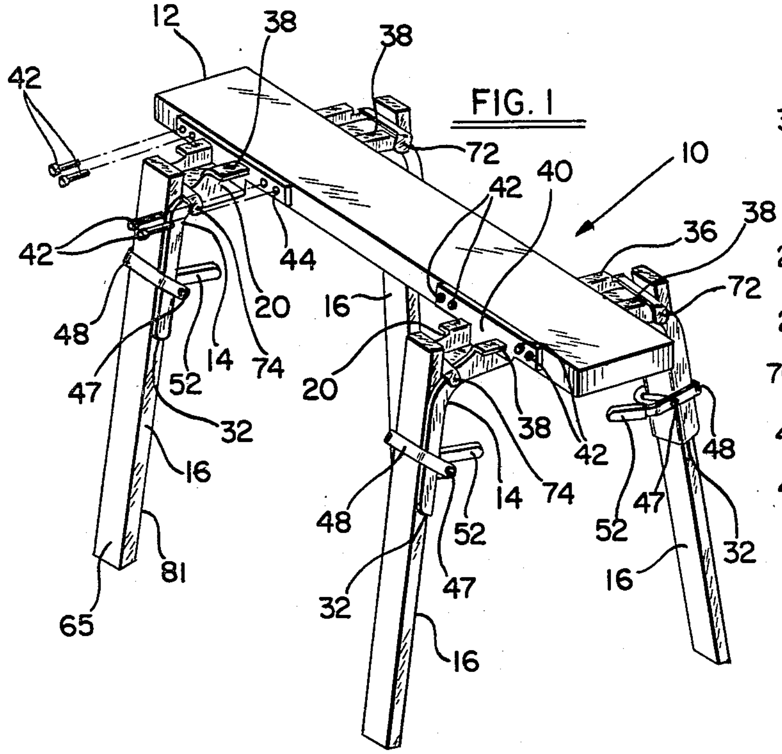
FIG. 1 is a perspective view of the improved work support frame of the present invention.

Top brackets 40, illustrated only in FIG. 1, are adjustably mounted atop the frame 14. The platform 12 is secured at the top brackets 40 by means of fasteners 42 which pass through apertures 44 to engage the platform 12.

Support lugs 46 are punched from the base 18 as shown in FIGS. 2, 3, 5, 6 and 7 of the leg portions 30 in aligned pairs with apertures centrally therein to receive an axle 47 therein (see FIG. 2). A coil spring 51 is fitted upon the axle 47 to urge a substantially "U" shaped clamp 48 to rotate in the direction of the leg portion 30 so as to lockingly engage the two (2)-foot-by-four (4)-foot legs 16 whenever the legs are assembled to the frame 14. The clamp 48 pivots about the axle 47 so that its leading edge 49 is disposed upwardly and biased toward the leg portion 30. Diametrically opposite sides of the clamps 48 extend outwardly to form handle 50 which receives a vinyl grip 52. The portion of the clamp 48 extending across the channel 26 is substantially flat at the leading edge 49 thereof.

As illustrated in FIGS. 5 through 8, each flange 20, 22 is provided with recesses 58 positioned to receive the clamp 48. Preferably, each recess 58 comprises a notch, having upper and lower edges 60, 62, respectively, such that when the clamp 48 is urged toward the base 18, recesses 58 will receive the clamp 48 against the upper edges 60 thereof. In this manner, recesses 58 permit the leading edge 49 of the clamp 48 to be urged closer to the base 18 than would otherwise be possible.

Figure 8:
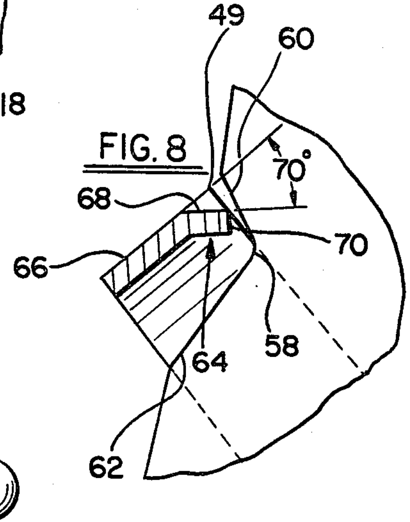
FIG. 8 is a front elevational view, partly in section, taken along line 8—8 of FIG. 5 showing the teeth of the clamp in preferred angularity.

The leading edge 49 of the clamp 48 is provided with a plurality of short teeth 64 illustrated best in FIG. 8 formed thereon for biting into the outer sides of two (2)-foot-by-four (4)-foot board legs 16 disposed within the depending leg portions 30 of the frame 14 and, thereby, insuring the locking engagement of the clamp 48 therewith.

The teeth 64 are disposed along the leading edge 49 of the clamp 48 at an angle of 70° with respect to such edge. This places the teeth 64 substantialy perpendicular to the outer face of the two (2)-foot-by-four (4)-foot leg 16 to urge a positive clamping action therebetween.

Teeth 64 extend from a base 66 of the leading edge 49 as at "V" projections 68 which terminate at biting tips 70.

Opening of the clamps 48 permits insertion of legs 16 into the channels 26 wherein the height thereof is adjusted to level the frame 14. Whenever the clamp 48 engages the leg 16 it causes the teeth 64 to bite into the upper surface 65 of leg 16.

When the legs 16 are the two (2)-foot-by-four (4)-foot they may be standard (FIG. 7) or substandard (FIG. 6) in cross-section.

Under urging of the clamp 48, the leg 16 is wedge-locked against the arcuate seat 31.

Figure 6:
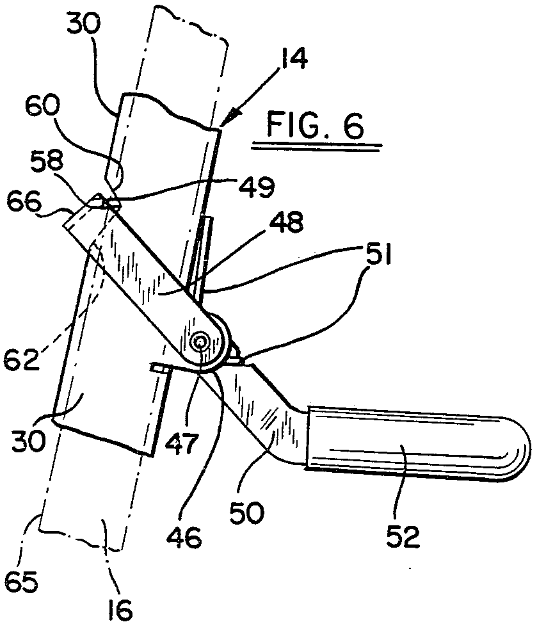
FIG. 6 is a partial front elevational view of the leg portion of the frame showing the clamp extending into the notch to engage a substandard leg.
Figure 7:
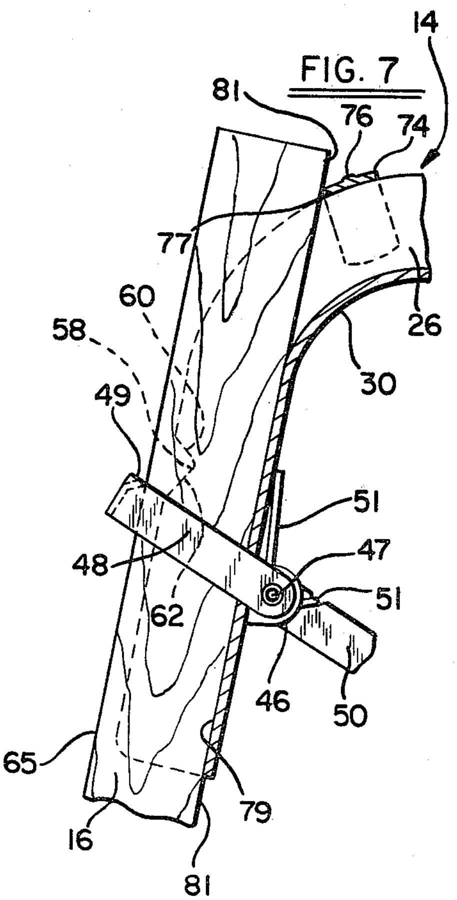
FIG. 7 is a front elevational view, partly in section, of the frame including a bracing member, with the clamp engaging a standard leg.

When the width of the leg 16 is standard, its outer surface extends beyond the flanges 20, 22 to permit normal clamp 48 engagement as shown in FIG. 7. However, when the width of the leg 16 is substandard, as shown in FIG. 6, the upper surface 65 lies below the height of the flanges 20, 22 so that the clamp 48 will extend into the recesses 58 and thereby engage and clamp the leg 16 to the leg portion 30. The angular orientation of the teeth 64 relative to a hypothetical line from leading edge 49 of the clamp 48 is 70° as shown in FIG. 8. This permits the teeth 64 to bite into the upper surface of a leg 16 substantially perpendicular whether it is standard or substandard.

The bracing members 72 provide improved lateral support for the frame 14. The bracing members 72 shown in FIGS. 4, 5 and 8 have bracing straps 74 which extend across the open channel 26 of the frame 14 with the ends thereof connected to the flanges 20, 22 as by welding. The straps 74 may be strengthened by ridges 76. A leading edge 77 is formed on the straps 74 in alignment with the base 79 of the leg portion 30 as illustrated in FIG. 7 so as to engage the lower surface 81 of the legs 16 in spaced relation to the leg portion 30 as it crosses the horizontal portion 28. This stabilizes the leg 16 and prevents it from pivoting or shifting against the clamp 48 under load.

It will be understood that various changes in the details, materials, arrangement of parts and operating conditions which have been herein described and illustrated in order to explain the nature of the invention may be made by those skilled in the art within the principles and scope of the invention.

Having thus set forth the nature of the invention what is claimed herein is:

1. In a work support, the improvement which comprises:

(a) a unitary channel member having a top portion to support one end of a plank and further having integral bent leg portions at respective ends thereof, (b) clamp means on the leg portions for receiving and retaining support legs thereon, and (c) at least one bracing member carried on the channel member to support the leg in a direction of force opposite that exerted thereon by the clamp means.

2. The combination claimed in claim 1 wherein:

(a) the bracing member defines a strap affixed to the channel member on one side of the clamp means.

3. The combination claimed in claim 2 wherein:

(a) the strap affixed to the channel member on the upper side of the clamp means.

4. The combination claimed in claim 3 wherein:

(a) the leg portions having a flat surface against which the clamp urges the leg, and (b) the strap is spaced from the flat surface of the leg portion and lies in the plane of said flat surface.

5. In a work support, the improvement which comprises:

(a) a unitary channel member having a top portion to support one end of a plank and further having integral bent leg portions at respective ends thereof, (b) the leg portions have outwardly extending flanges formed adjacent the clamp means, (c) recesses are formed on the flanges, (d) clamp means affixed to the leg portions on one side of the recesses, and biased toward the flanges in the direction of the recesses to be releasably urged theretoward, and adapted to engage legs disposed in said leg portions, and (e) a bracing member carried on the work support remote from the clamp means to engage the legs and to coact with the clamp means and leg portions to positively clamp the legs thereto and prevent any lateral shifting of said legs.

6. The combination claimed in claim 5 wherein:

(a) the bracing member's defining straps, one for each leg portion, affixed to the flanges on one side of the clamp means.

7. The combination claimed in claim 6 wherein:

(a) the strap to engage the legs on the side opposite the clamp means engagement with the legs.

8. The combination claimed in claim 1 or 5 wherein:

(a) the clamp means has a leading edge, and (b) teeth are formed on the leading edge at an angle relative thereto whereby the teeth will engage the legs at an angle of incidence greater than that of the leading edge.

9. The combination claimed in claim 8 wherein:

(a) the teeth are set at an angle of substantially 70° with respect to the hypothetical line projected from the leading edge.

10. The combination claimed in claim 8 wherein:

(a) the teeth are set at a predetermined angle to engage standard legs substantially perpendicular, whereby positive clamping is obtained.

* * * * *